United States Patent
Shi et al.

(10) Patent No.: US 7,967,570 B2
(45) Date of Patent: Jun. 28, 2011

(54) LOW TRANSIENT THERMAL STRESS TURBINE ENGINE COMPONENTS

(75) Inventors: Jun Shi, Glastonbury, CT (US); Wayde R. Schmidt, Pomfret Center, CT (US)

(73) Assignee: United Technologies Corporation, Hartford, CT (US)

( * ) Notice: Subject to any disclaimer, the term of this patent is extended or adjusted under 35 U.S.C. 154(b) by 1201 days.

(21) Appl. No.: 11/829,391

(22) Filed: Jul. 27, 2007

(65) Prior Publication Data

US 2009/0028697 A1   Jan. 29, 2009

(51) Int. Cl.
*F01D 5/28* (2006.01)

(52) U.S. Cl. ............ 416/223 R; 416/241 R; 416/223 A; 416/244 A; 29/889.2

(58) Field of Classification Search ............... 416/223 R, 416/241 R, 223 A, 244 A; 29/889.2, 889.27; 415/200
See application file for complete search history.

(56) References Cited

U.S. PATENT DOCUMENTS

| | | | |
|---|---|---|---|
| 4,820,358 A * | 4/1989 | Chang | 148/567 |
| 4,900,635 A * | 2/1990 | Bowen et al. | 415/212.1 |
| 5,837,960 A * | 11/1998 | Lewis et al. | 219/121.63 |
| 6,228,437 B1 | 5/2001 | Schmidt | |
| 6,284,323 B1 | 9/2001 | Maloney | |
| 6,325,593 B1 | 12/2001 | Darkins et al. | |
| 6,641,893 B1 * | 11/2003 | Suresh et al. | 428/105 |
| 6,709,230 B2 | 3/2004 | Morrison et al. | |
| 6,730,422 B2 | 5/2004 | Litton et al. | |
| 6,902,836 B2 | 6/2005 | Eaton et al. | |
| 6,924,040 B2 | 8/2005 | Maloney | |
| 7,063,894 B2 | 6/2006 | Sun et al. | |
| 7,067,447 B2 | 6/2006 | Campbell | |
| 7,217,088 B2 | 5/2007 | Albrecht et al. | |
| 7,247,002 B2 | 7/2007 | Albrecht et al. | |
| 7,316,057 B2 * | 1/2008 | Seth | 29/458 |

FOREIGN PATENT DOCUMENTS

DE   3821005 A1   12/1989

* cited by examiner

*Primary Examiner* — Igor Kershteyn
(74) *Attorney, Agent, or Firm* — Bachman & LaPointe P.C.

(57) ABSTRACT

A turbine vane includes a platform; and at least one airfoil mounted to the platform and having a trailing edge and a leading edge, wherein the vane is composed of a functionally graded material having a first material and a second material, wherein the trailing edge includes a greater amount of the first material than the second material, and the leading edge includes a greater amount of the second material than the first material.

20 Claims, 2 Drawing Sheets

LOW TRANSIENT THERMAL STRESS TURBINE ENGINE COMPONENTS

GOVERNMENT RIGHTS

The United States Government may have certain rights in the invention pursuant to contract number DE-FC02-00CH11060 awarded by the Department of Energy.

FIELD OF THE INVENTION

The invention relates to turbine engine components and, more particularly, relates to low thermal stress turbine engine components.

BACKGROUND OF THE INVENTION

Referring to FIGS. 1 and 2, turbine vanes in a gas turbine engine are exposed to high temperature combustion gas which imparts an intensive heat load onto the vanes. Since aerodynamic design of turbine vanes stipulates a thin trailing edge, the heat load leads to a chordwise temperature gradient in the vane. The thinner wall at the trailing edge means a lower thermal mass and thus translates into experiencing a higher temperature than the thicker leading edge under steady state conditions. During transient conditions such as engine start-up (See FIG. 1) or shutdown (See FIG. 2), the thin trailing edge would heat-up or cool-down faster than the thicker leading edge. The resulting temperature difference between the leading edge and the trailing edge could be much more severe under these transient conditions than the temperature difference experienced under steady state conditions.

The temperature gradient causes the leading edge to expand differently from the trailing edge and consequently generates thermal stress at the blade root where it joins vane inner and outer platforms (not shown). The two platforms actually make the stressing condition worse by forcing the leading edge deformation onto the trailing edge. Because of the relatively thin wall thickness at the trailing edge, the thermal stress is greater at the trailing edge than at the leading edge. Also, since the shutdown conditions produce high tensile stress, the thermal stress is more damaging at shutdown than at start-up conditions.

Due to the severity of these thermal stresses, it is necessary to maintain the thermal stresses at an acceptable level for component durability. That is, however, not always possible for a given engine operating condition and, in particular, when the turbine engine component is composed of low strength materials. Therefore, there exists a need to lower thermal stress at the vane trailing edge, especially during transient conditions such as engine shutdown, across a broad range of engine operating conditions for turbine vanes of any composition in order to ensure robust component life.

SUMMARY OF THE INVENTION

In at least one aspect of the present disclosure, a process for manufacturing a turbine engine component broadly comprises fabricating a turbine engine component using a functionally graded composite material having at least two different materials.

In at least another aspect of the present disclosure, a process for manufacturing a turbine engine component broadly comprises fabricating a turbine engine component using a functionally graded composite material having a first phase and a second phase; and infiltrating at least a portion of the second phase with at least one material.

In at least yet another aspect of the present disclosure, a turbine vane broadly comprises a platform, and at least one airfoil mounted to the platform and having a trailing edge and a leading edge; wherein the vane is composed of a functionally graded material having a first material and a second material, wherein the trailing edge includes a greater amount of the first material than the second material, and the leading edge includes a greater amount of the second material than the first material.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
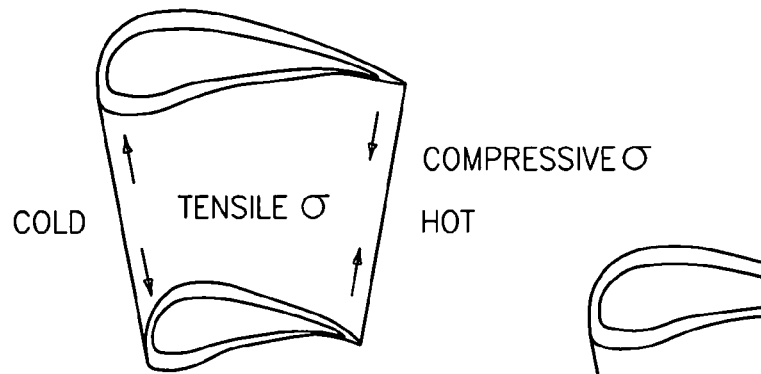
FIG. 1 is a representation of the thermal and stress state of a turbine engine component at start-up and steady state.
Figure 2:
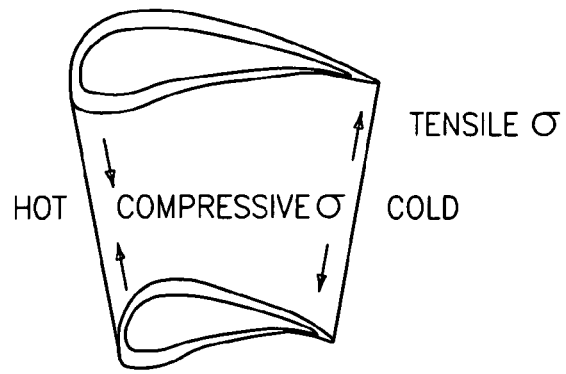
FIG. 2 is a representation of the thermal and stress state of the turbine engine component of FIG. 1 at shutdown.
Figure 3:
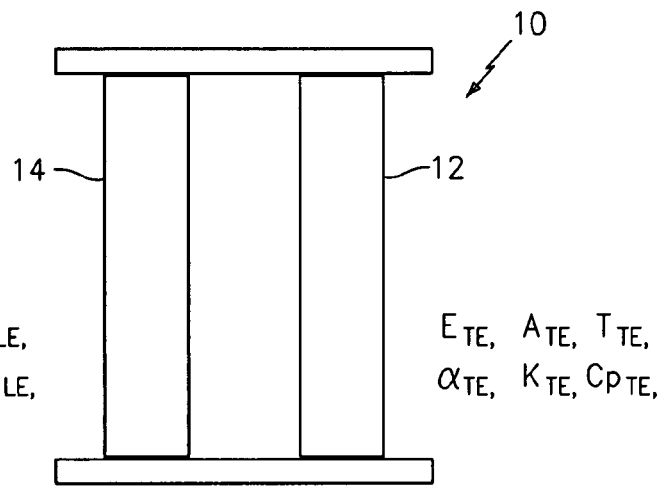
FIG. 3 is a representation of a thermal stress model for a turbine vane.

Referring now to FIG. 3, the thermal stresses experienced by a turbine engine component, e.g., a turbine vane 10, may be demonstrated using a thermal stress model represented by a two bar system. The thermal stress in a trailing edge 12 of the vane 10 may be represented by the two bar system by the following equation:

$$\sigma_{TE} = \frac{T_{LE}\alpha_{LE} - T_{TE}\alpha_{TE}}{E_{LE}/E_{TE} + A_{TE}/A_{LE}} E_{LE} \quad (1)$$

where the subscript LE denotes the leading edge, the subscript TE denotes the trailing edge, T is the temperature, $\alpha$ is the thermal expansion coefficient, A is the cross-sectional area, and E is the Young's modulus. Formula (1) assumes a zero stress state at room temperature. If this is not true and a stress free state exists at another temperature $T_0$, then Formula (1) should be modified as follows:

$$\sigma_{TE} = \frac{(T_{LE} - T_0)\alpha_{LE} - (T_{TE} - T_0)\alpha_{TE}}{E_{LE}/E_{TE} + A_{TE}/A_{LE}} E_{LE} \quad (2)$$

In accordance with both Formulas (1) and (2), the thermal stress at the trailing edge 12 may be primarily controlled by the thermal expansion mismatch ($T_{LE}\alpha_{LE}-T_{TE}\alpha_{TE}$) and the leading edge and trailing edge stiffness and area ratios. First, we turn our attention to the thermal expansion mismatch. Assuming that $T_{LE}$ is greater than $T_{TE}$ as in the case of an engine shutdown state, the thermal expansion coefficient at the trailing edge 12 should be higher than the thermal expansion coefficient at the leading edge 14 in order to lower the thermal stress. Further, the temperature difference between the leading edge 14 and the trailing edge 12 may be minimized by increasing the heat capacity and by reducing the heat conductivity of the trailing edge 12. The trailing edge stress may also be lowered by increasing the trailing edge section area and lowering the stiffness of the trailing edge 12. It is also important to note the difference in thermal physical properties between the leading edge 14 and trailing edge 12 may also be realized by changing the material composition or microstructure during processing so that the trailing edge material has a higher thermal expansion coefficient and thermal capacity, but lower heat conductivity compared to the leading edge material.

The impact of key material and geometrical properties on the thermal stress of a turbine vane under shutdown conditions is summarized in the table provided below.

TABLE of Optimal Material/Geometrical Property Changes on Leading and Trailing Edges in order to reduce overall thermal stress.

| Property | Leading Edge | Trailing Edge | Effect |
| --- | --- | --- | --- |
| Coefficient of thermal expansion | ↑ | ↓ | Reduce thermal growth mismatch between LE and TE |
| Heat Capacity | ↓ | ↑ | Reduce temperature difference between LE and TE |
| Conductivity | ↑ | ↓ | Reduce temperature difference between LE and TE |
| Modulus E | ↓ | ↑ | Reduce stiffness mismatch between LE and TE |
| Section area | ↓ | ↑ | Reduce stiffness mismatch between LE and TE |

Based upon the impact of these key material and geometric properties, an exemplary turbine vane microstructure described herein may be controlled by the proper choice of fabrication and/or manufacturing technique(s), materials and subsequent processing steps. By selectively positioning material(s) within the structure of the exemplary turbine vane described herein, the properties critical for performance may be controlled. Specifically, the aforementioned properties such as the CTE, heat capacity, thermal conductivity and Young's Modulus can be controlled locally within the bulk article of the exemplary turbine vane by the selective placement of various materials. The exemplary process described herein, and resulting exemplary turbine vane, may be applied to a broad range of material such as ceramic, metallic and composites.

The exemplary turbine vanes described herein are composed of a graded composition designed to at least substantially reduce and/or eliminate the obstacles associated with severe thermal stress(es) experienced by prior art turbine engine components.

The term "graded composition" means any one of the following: (1) a composition composed of different materials such as metal, ceramic, metal alloy, composite particle, mixed powders, multiple metals or ceramics, and the like; (2) a composition composed of materials having different morphologies, e.g., spherical, blocky, acicular, whiskers, fibrous, and the like; (3) a composition composed of materials having different microstructures, e.g., amorphous, crystalline, crystalline phase, and the like; or (4) a composition composed of materials exhibiting the physical properties of the aforementioned compositions (1), (2) and (3), wherein the composition exhibits a graded structure such as linear, non-linear, step functions, quadratic, polynomial, point defects and other mathematical strategies for generation of grading as known to one of ordinary skill in the art.

The materials mentioned in describing the aforementioned compositions may be produced using suitable fabrication techniques include solid freeform fabrication technologies (SFF) or rapid manufacturing techniques such as fused deposition modeling (FDM), extrusion freeform fabrication (EFF), laser-enhanced net shaping (LENS), 3-dimensional printing (3DP), ink jet printing, selective laser sintering (SLS) and the like; combinations comprising at least one of the foregoing techniques, and the like. SFF techniques can produce parts from metal, ceramic and polymers, as well as mixed or composite powders and alloys. Certain techniques are more amenable to the use of powder-based materials while other techniques are more suitable for bulk materials in wire or vapor form. For example, FDM is an extrusion-based process for thermoplastics that has been modified to incorporate metal, ceramic and mixed powders suitable for fabricating metal, ceramic and mixed metal/ceramic objects. Also, EFF is used to fabricate functionally graded materials (FGM) by extrusion of two dissimilar materials. Generally, FGMs consist of a synergistic combination of two materials, e.g., a metal and a ceramic. However, it is conceivable that two or more dissimilar metal or ceramic phases having a continuous composition gradient between their respective end members, e.g., ceramic phase 1 and ceramic phase 2. SLS techniques permit sintering polymer coated metal or ceramic powders. Other laser-based techniques such as LENS are used to directly melt a wire or powder feedstock of the target composition. In addition to the fabrication techniques described above, the composite material may form a first phase and a second phase, where the second phase is composed of at least one and/or a plurality of pores, that is, a residual porosity. The residual porosity may be infiltrated with a metal such as copper or bronze, or other aforementioned material, to densify the part and create a "composite" part containing uniformly distributed steel and copper, for example. The residual porosity may also be infiltrated with a polymer, polymer blend or filled polymer system designed to convert to select metal and/or ceramic phase(s). One example of such a method is described in U.S. Pat. No. 6,228,437 to Schmidt, assigned to United Technologies Corporation, which is incorporated by reference herein in its entirety.

Figure 4:
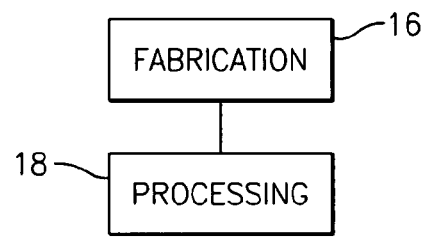
FIG. 4 is a flowchart representing an exemplary process of manufacturing the exemplary turbine engine components described herein.

Referring now to the flowchart of FIG. 4, the exemplary turbine engine components described herein may be manufactured at step 16 using any one of a number of techniques known to one of ordinary skill in the art. For example, suitable techniques may include rapid prototyping processes, rapid manufacturing processes such as 3-D printing methods, laser deposition techniques, fused deposition modeling, thermal spray techniques, investment casting, combinations comprising at least one of the foregoing methods, and the like. In addition to or in the alternative to direct fabrication of solid articles, turbine engine components exhibiting a residual porosity may be infiltrated, or back-filled, at step 18 with another desirable phase or combination of phases. An example of such fabrication techniques is disclosed in U.S. Pat. No. 6,228,437 to Schmidt. In addition to or in the alternative to direct fabrication of solid articles, turbine engine components may be subsequently processed (e.g. thermally, chemically, etc.) to convert one or more phases within the structure to another phase, or to completely remove one or more phases (e.g. leaching, melting, etc.). When completed, at least a portion, if not in their entirety, of the exemplary turbine engine components may also be coated. Representative suitable coatings include those in U.S. Pat. Nos. 6,924,040, 6,730,422, 6,284,323, 6,902,836, and 7,063,894 assigned to United Technologies Corporation, and incorporated by reference herein in their entirety. Coating architectures and deposition methods will be selected depending on the substrate composition (e.g. metal, ceramic, ceramic matrix composite, alloy, etc.).

Figure 5A:
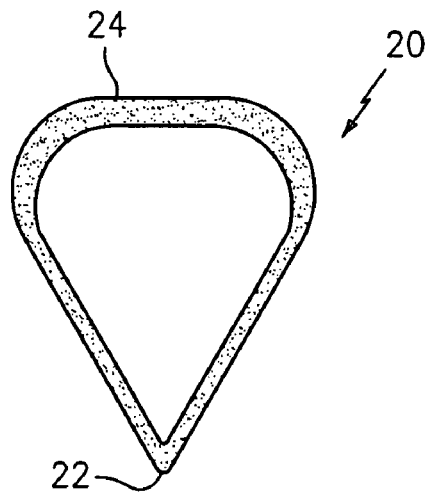
FIG. 5A is a representation of an exemplary turbine engine component composed of a material types I and II.
Figure 5B:
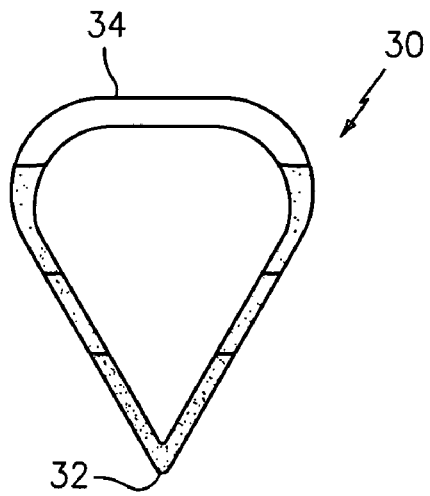
FIG. 5B is a representation of another exemplary turbine engine component composed of a material types I and II.

Referring now to FIGS. 5A and 5B, representations of a pair of exemplary turbine engine components 20, 30 described herein are shown. Turbine engine components 20, 30 may comprise both material type I and material type II. As mentioned above, to reduce the thermal stress being experienced, it is desirable to reduce the CTE of a leading edge 24, 34 relative to the CTE of a trailing edge 22, 32 as shown in the exemplary turbine engine component of FIG. 5A. Conversely, it is desirable to increase the CTE of the trailing edge 22, 32 relative to the CTE of the leading edge 24, 34 as shown in the exemplary turbine engine component of FIG. 5B For exemplary purposes, material type I has a higher CTE value, and likewise a higher heat capacity, than material type II. In FIG. 5A, exemplary turbine engine component 20 exhibits a smooth (linear) gradient of the two materials between the leading edge 24 and trailing edge 22. As a result, the leading edge 24 region has a reduced heat capacity relative to the trailing edge 22 region.

For exemplary purposes, material type II has a relatively low CTE and heat capacity compared to material type I. In the alternative to the exemplary grading strategies shown in FIG. 5A, a non-linear grading strategy may be utilized. Referring now to FIG. 5B, a discontinuous step function may be employed so that a greater amount of material type II may be applied at the trailing edge 32, with decreasing amounts of material type II positioned nearer the leading edge 34 of the exemplary turbine engine component 30.

Figure 6A:
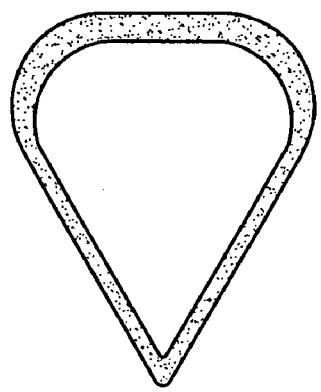
FIG. 6A is a representation of yet another exemplary turbine engine component composed of material types I and II.
Figure 6B:
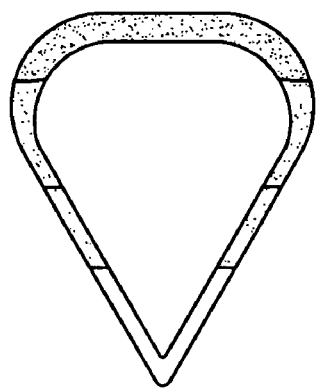
FIG. 6B is a representation of still yet another exemplary turbine engine component composed of a baseline material and material type II.

Referring to FIGS. 6A and 6B, representations of another pair of exemplary turbine engine components described herein are shown. As also mentioned above, it is desirable to have a higher thermal conductivity and stiffness (as measured by Young's modulus) in the vicinity of the leading edge. For purposes of illustration, material type I exhibits both a higher thermal conductivity and greater stiffness compared to material type II. Referring now to FIG. 5A, an exemplary turbine engine component 40 may be manufactured to possess a continuous grading between the material type II at the trailing edge to the material type I at the leading edge.

In the alternative to the exemplary turbine engine component of FIG. 6A, an exemplary turbine engine component 50 of FIG. 6B may be composed of a baseline material being modified in a discontinuous manner by the introduction of greater concentrations of material type II having a relatively higher thermal conductivity and stiffness as compared to the baseline material.

The exemplary turbine engine components described herein possess distinct advantages over turbine engine components of the prior art. First, the functionally graded materials used to manufacture these components may be tailored to exhibit the most advantageous combination of the mechanical and thermal properties disclosed above in Table 1. Prior art turbine engine components composed of only ceramic or metal only possess and exhibit certain mechanical properties under certain operating conditions, e.g., start-up and shut-down. In contrast, the functionally graded materials used herein exhibit an advantageous combination of mechanical and thermal properties across a broad range of operating conditions. Secondly, the development of rapid manufacturing techniques have progressed to the point where the costs involved are comparable and commensurate with certain casting processes typically employed to manufacture turbine engine components. Other advantages and benefits to using functionally graded materials in constructing turbine engine components include the potential for significant weight reduction, tailorable erosion and abrasion resistance, more efficient heat transfer and/or increased fuel efficiency.

One or more embodiments of the present invention have been described. Nevertheless, it will be understood that various modifications may be made without departing from the spirit and scope of the invention. Accordingly, other embodiments are within the scope of the following claims.

What is claimed is:

1. A process for manufacturing a turbine engine component comprising fabricating a turbine engine component having an airfoil portion with a leading edge and a trailing edge using a functionally graded composite material having at least two different materials including a first material and a second material, and said fabricating step comprising fabricating said trailing edge to include a greater amount of said first material than said second material and fabricating said leading edge to include a greater amount of said second material than said first material.

2. The process of claim 1, wherein fabricating comprises grading said at least two different materials to form said functionally graded material of said turbine engine component.

3. The process of claim 2, wherein grading comprises at least one of the following types of grading: linear, non-linear, step functions, quadratic, polynomial, point defects, and combinations thereof.

4. The process of claim 1, wherein fabricating comprises at least one of the following processes: solid freeform fabricating, selective laser sintering, fused deposition modeling, extrusion freeform fabricating, laser enhanced net shaping, 3-dimensional printing, ink jet printing and combinations thereof.

5. The process of claim 1, wherein said at least two different materials comprises at least two of the following materials: metal, ceramic, metal alloy, mixed powders, composite particle, multiple metals or ceramics, and combinations thereof.

6. The process of claim 1, wherein said at least two different materials each exhibit different morphologies or different microstructures or both different morphologies and different microstructures.

7. The process of claim 1, wherein said at least two different materials are at least two different powdered materials.

8. The process of claim 1, wherein said turbine engine component comprises a functionally graded composite material structure having a first phase and a second phase.

9. The process of claim 8, further comprising infiltrating at least a portion of said second phase with at least one material.

10. The process of claim 9, wherein said at least one material comprises at least one of the following materials: metal, metal alloy, ceramic, composite particle, mixed powders and combinations thereof.

11. A process for manufacturing a turbine engine component comprising fabricating a turbine engine component using a functionally graded composite material having at least two different materials, wherein said turbine engine component comprises a functionally graded composite material structure having a first phase and a second phase, infiltrating at least a portion of said second phase with at least one material, and wherein said second phase comprises a residual porosity.

12. A process for manufacturing a turbine engine component, comprises:

fabricating a turbine engine component using a functionally graded composite material having a first phase and a second phase; and infiltrating at least a portion of said second phase with at least one material, wherein said second phase comprises a residual porosity.

13. The process of claim 12, wherein fabricating comprises at least one of the following processes: solid freeform fabricating, selective laser sintering, fused deposition modeling, extrusion freeform fabricating, laser enhanced net shaping, 3-dimensional printing, ink jet printing and combinations thereof.

14. The process of claim 13, wherein fabricating further comprises grading at least two different materials to form said functionally graded composite material.

15. The process of claim 14, wherein grading comprises at least one of the following types of grading: linear, non-linear, step functions, quadratic, polynomial, point defects, and combinations thereof.

16. A turbine vane, comprising:
a platform; and
at least one airfoil mounted to said platform and having a trailing edge and a leading edge,
wherein the vane is composed of a functionally graded material having a first material and a second material,
wherein said trailing edge includes a greater amount of said first material than said second material, and said leading edge includes a greater amount of said second material than said first material.

17. The turbine vane of claim 16, wherein said first material possesses a greater coefficient of thermal expansion and lower heat capacity than a coefficient of thermal expansion and heat capacity of said second material.

18. The turbine vane of claim 16, wherein said second material possesses a greater thermal conductivity value and greater stiffness than a thermal conductivity value and stiffness of said first material.

19. The turbine vane of claim 16, wherein said functionally graded composite material comprises at least two of the following materials: metal, metal alloy, ceramic, mixed powders, composite particle, multiple metals or ceramics, and combinations thereof.

20. The turbine vane of claim 16, wherein said functionally graded composite material comprises at least two different materials, each of said at least two different materials exhibit different morphologies or different microstructures or both different morphologies and different microstructures.

* * * * *